(12) United States Patent  
Carrender et al.

(10) Patent No.: US 6,745,008 B1
(45) Date of Patent: Jun. 1, 2004

(54) MULTI-FREQUENCY COMMUNICATION SYSTEM AND METHOD

(75) Inventors: Curtis Lee Carrender, Richland, WA (US); Ronald W. Gilbert, Benton City, WA (US)

(73) Assignee: Battelle Memorial Institute K1-53, Richland, WA (US)

( * ) Notice: Subject to any disclaimer, the term of this patent is extended or adjusted under 35 U.S.C. 154(b) by 318 days.

(21) Appl. No.: 09/589,000

(22) Filed: Jun. 6, 2000

(51) Int. Cl.[7] .............................. H04B 7/08; H04Q 5/22; G01S 13/74
(52) U.S. Cl. ...................... 455/41.1; 455/42; 455/90.1; 455/106; 455/151.2; 455/67.11; 340/10.1; 340/10.2; 342/42; 342/43; 342/44; 342/45; 342/46; 342/47; 342/48; 342/49; 342/50; 342/51
(58) Field of Search .............................. 340/572.4, 572.2, 340/10.1, 10.3, 10.4, 10.41, 825.54, 152 R, 168, 572.8, 572.5; 375/283; 370/527, 204, 205; 455/45, 69, 911.1, 412–42, 20, 403, 151.2, 73, 90.1, 106, 227, 67.1; 379/58, 93, 89; 342/42–51, 30–32

(56) References Cited

U.S. PATENT DOCUMENTS

| 3,705,385 | A | * | 12/1972 | Batz ....................... 340/870.02 |
| 4,064,487 | A | * | 12/1977 | Russell et al. ......... 340/825.58 |
| 4,075,632 | A | | 2/1978 | Baldwin et al. ............. 343/6.8 |
| 4,360,810 | A | | 11/1982 | Landt .......................... 343/6.5 |
| 4,736,207 | A | | 4/1988 | Siikarla et al. ............. 343/895 |
| 4,833,481 | A | * | 5/1989 | Shibano et al. ............. 342/457 |
| 5,369,800 | A | | 11/1994 | Takagi et al. ................. 455/59 |
| 5,450,492 | A | | 9/1995 | Hook et al. ................... 380/28 |
| 5,517,195 | A | | 5/1996 | Narlow et al. ................ 342/51 |
| 5,694,454 | A | * | 12/1997 | Hill et al. .................... 455/403 |
| 5,699,055 | A | * | 12/1997 | Dykema et al. ........ 340/825.22 |
| 5,771,021 | A | * | 6/1998 | Veghte et al. ................. 342/51 |
| 5,850,181 | A | | 12/1998 | Heinrich et al. ............ 340/572 |
| 5,864,302 | A | * | 1/1999 | Kokubu et al. ............ 340/10.5 |
| 6,091,342 | A | * | 7/2000 | Janesch et al. ............ 340/10.2 |
| 6,177,861 | B1 | | 1/2001 | MacLellan et al. ........ 340/10.1 |
| 6,249,229 | B1 | | 6/2001 | Eckstein et al. ......... 340/572.4 |
| 6,362,738 | B1 | * | 3/2002 | Vega ....................... 340/572.1 |
| 6,456,668 | B1 | * | 9/2002 | MacLellan et al. ......... 375/283 |
| 6,480,143 | B1 | * | 11/2002 | Kruger et al. ................. 342/44 |
| 6,505,321 | B1 | | 1/2003 | MacLellan et al. ......... 714/802 |

FOREIGN PATENT DOCUMENTS

| EP | 0 706 144 A2 | | 4/1996 |
| EP | 0 973 117 A2 | | 1/2000 |
| EP | 0973117 A2 | * | 1/2000 |

* cited by examiner

*Primary Examiner*—Sinh Tran
*Assistant Examiner*—Kamran Afshar
(74) *Attorney, Agent, or Firm*—Seed IP Law Group PLLC (57) ABSTRACT

A multi-frequency RFID remote communication system is provided that includes a plurality of RFID tags configured to receive a first signal and to return a second signal, the second signal having a first frequency component and a second frequency component, the second frequency component including data unique to each remote RFID tag. The system further includes a reader configured to transmit an interrogation signal and to receive remote signals from the tags. A first signal processor, preferably a mixer, removes an intermediate frequency component from the received signal, and a second processor, preferably a second mixer, analyzes the IF frequency component to output data that is unique to each remote tag.

30 Claims, 5 Drawing Sheets

MULTI-FREQUENCY COMMUNICATION SYSTEM AND METHOD

This invention was made with Government support under Contract DE-AC0676RLO1830 awarded by the U.S. Department of Energy. The Government has certain rights in the invention.

FIELD OF THE INVENTION

The present invention pertains to a remote communication system, and, more particularly, to a radio frequency identification system and method for the transmission and reception at multiple frequencies of data stored on radio frequency identification tags.

BACKGROUND OF THE INVENTION

Remote communication utilizing wireless equipment typically relies on radio frequency (RF) technology, which is employed in many industries. One application of RF technology is in locating, identifying, and tracking objects, such as animals, inventory, and vehicles.

Figure 1:
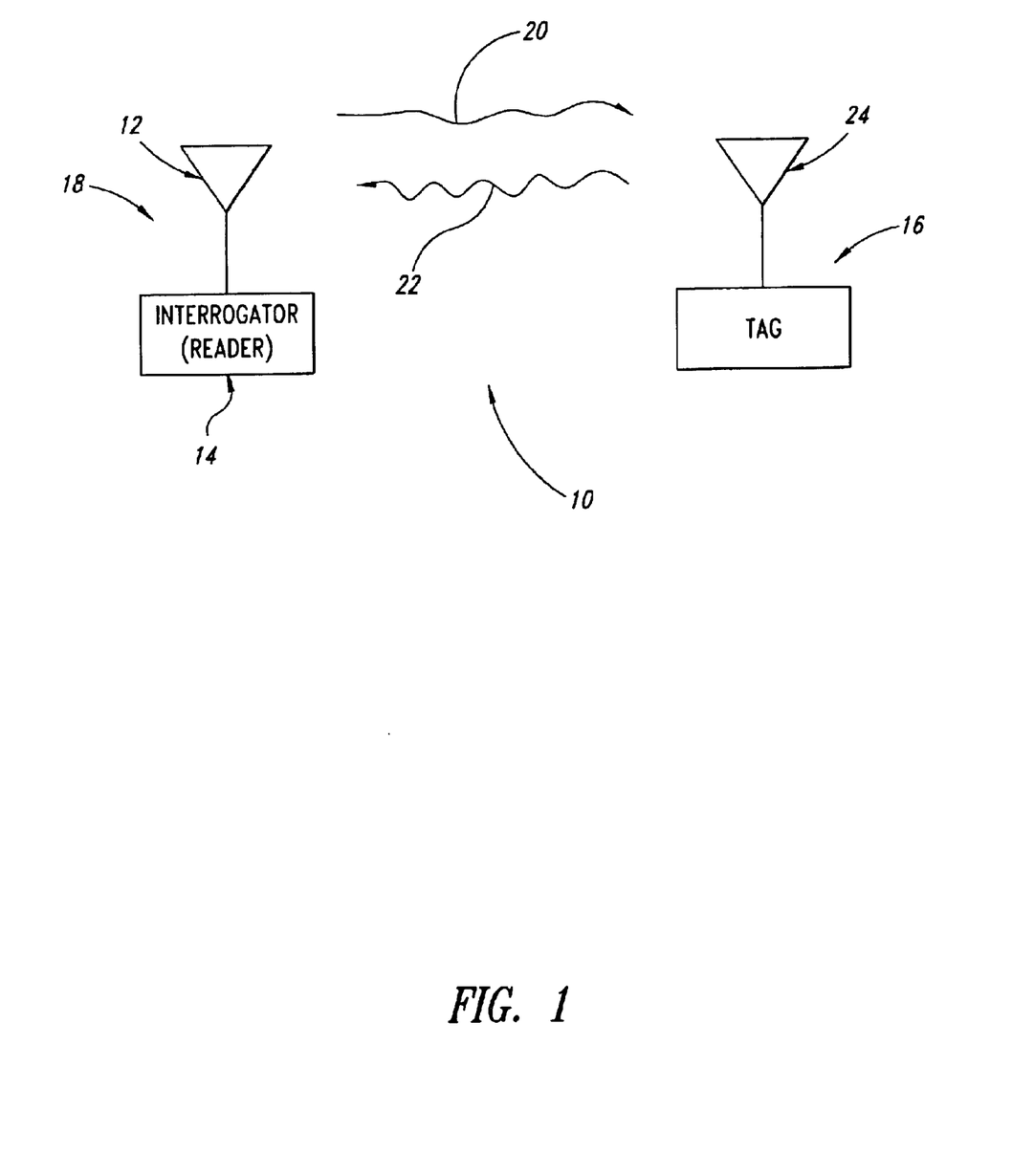
FIG. 1 is a diagram of an existing RF tag system.

RF identification (RFID) tag systems have been developed to facilitate monitoring of remote objects. As shown in FIG. 1, a basic RFID system 10 consists of three components, an antenna 12 or coil, a transceiver with decoder 14, and a transponder (commonly called an RF tag) 16. In operation, the antenna 12 emits electromagnetic radio signals generated by the transceiver 14 to activate the tag 16. When the tag 16 is activated, data can be read from or written to the tag.

In some applications, the antenna 12 is a component of the transceiver and decoder 14 to become an interrogator (or reader) 18, which can be configured either as a hand held or a fixed-mount device. The interrogator 18 emits the radio signals 20 in range from one inch to one hundred feet or more, depending upon its power output and the radio frequency used. When an RF tag 16 passes through the electromagnetic radio waves 20, the tag 16 detects the signal 20 and is activated. Data encoded in the tag 16 is then transmitted by a data signal 22 through an antenna 24 to the interrogator 18 for subsequent processing.

An advantage of RFID systems is the non-contact, non-line-of-sight capability of the technology. Tags can be read through a variety of substances such as snow, fog, ice, paint, dirt, and other visually and environmentally challenging conditions where bar codes or other optically-read technologies would be useless. RF tags can also be read at remarkable speeds, in most cases responding in less than one hundred milliseconds.

There are three main categories of RFID tags. These are beam-powered passive tags, battery-powered semi-passive tags, and active tags. Each operate in fundamentally different ways.

The beam-powered RFID tag is often referred to as a passive device because it derives the energy needed for its operation from the radio frequency energy beamed at it. The tag rectifies the field and changes the reflective characteristics of the tag itself, creating a change in reflectivity that is seen at the interrogator. A battery-powered semi-passive RFID tag operates in a similar fashion, modulating its RF cross section in order to reflect a delta to the interrogator to develop a communication link. Here, the battery is the source of the tag's operational power. Finally, in the active RFID tag, a transmitter is used to create its own radio frequency energy powered by the battery.

A typical RF tag system 10 will contain at least one tag 16 and one interrogator 18. The range of communication for such tags varies according to the transmission power of the interrogator 18 and the tag 16. Battery-powered tags operating at 2,450 MHz have traditionally been limited to less than ten meters in range. However, devices with sufficient power can reach up to 200 meters in range, depending on the frequency and environmental characteristics.

Conventional RF tag systems utilize continuous wave backscatter to communicate data from the tag 16 to the interrogator 18. More specifically, the interrogator 18 transmits a continuous-wave radio signal to the tag 16, which modulates the signal 20 using modulated backscattering wherein the electrical characteristics of the antenna 24 are altered by a modulating signal from the tag that reflects a modulated signal 22 back to the interrogator 18. The modulated signal 22 is encoded with information from the tag 16. The interrogator 18 then demodulates the modulated signal 22 and decodes the information.

Conventional continuous wave backscatter RF tag systems can read but only one tag at a time in serial fashion. Because only a limited number of tags can be read over a given period of time, the amount of data the system can process over the period of time is restricted. In addition, the amount of information that can be transmitted from a single tag is limited due to the serial nature of conventional technology.

SUMMARY OF THE INVENTION

The present invention is directed to a multi-frequency communication system between a reader and one or more remote communication devices and a method related thereto. In accordance with one embodiment of the invention, a remote communication device is provided that includes a communication circuit configured to receive a first signal and to return a second signal responsive to the first signal, the second signal including a first modulation component and a second modulation component, the second modulation component having at least one data signal unique to the remote communication device. Ideally the first and second signals are radio frequency signals.

In accordance with another aspect of the present invention, the communication circuit includes at least one data signal generator for generating the second modulation component. Alternatively, the second modulation component can include first and second data signals generated by first and second data signal generators or by a variable frequency data signal generator.

In accordance with another embodiment of the present invention, a remote communication device is provided that includes an antenna for receiving at least a first signal and to return a second signal; and a processing circuit coupled to the antenna for generating the second signal in response to the first signal, the processing circuit having a modulation circuit for modulating the second signal at a primary frequency and at least one intermediate frequency (IF) that includes data unique to the remote communication device. Ideally, the first and second signals are radio frequency signals.

In accordance with another aspect of this embodiment of the invention, the primary frequency comprises first and second states and the intermediate frequency is imposed on the first state. Alternatively, the second signal comprises the primary frequency and first and second intermediate frequencies, with the first intermediate frequency imposed on the first state and the second intermediate frequency imposed on the second state.

In accordance with another embodiment of the present invention, a reader for communicating with a plurality of remote communication devices at multiple IF frequencies is provided. The reader includes an antenna for receiving a plurality of remote signals at multiple IF frequencies; and a first receiving circuit coupled to the antenna for simultaneously extracting data from each of the remote signals. Ideally, the receiving circuit comprises a plurality of processing circuits for extracting data from each of the remote signals, each of the plurality of processing circuits configured to process a remote signal of a predetermined frequency.

In accordance with another aspect of this embodiment of the invention, a second receiving circuit is provided for simultaneously extracting data from each of the remote data signals that are not received in the first receiving circuit, such as due to phase shifting, such as from quadrature nulls.

In accordance with another aspect of this embodiment of the invention, the reader includes a transmitting circuit coupled to the antenna for transmitting an interrogation signal to the remote communication devices. In one embodiment the antenna includes a transmitting antenna and a receiving antenna. Optionally, a low noise amplifier is coupled between the receiving antenna and the first and second receiving circuits.

In accordance with another aspect of this embodiment of the invention, the first receiving circuit includes a first processing circuit for extracting an intermediate frequency signal and a second processing circuit for extracting data from the intermediate frequency signal.

In accordance with yet another embodiment of the present invention, a multi-frequency communication system for communicating with a plurality of remote communication devices is provided. The system includes a plurality of remote communication devices, each device configured as described above, and a reader for communicating with a plurality of remote communication devices at multiple IF frequencies, as described above.

In accordance with another embodiment of the invention, a method for multi-frequency communication between a plurality of remote communication devices is provided, the method including receiving an interrogation signal at the plurality of remote communication devices; generating a remote signal responsive to the interrogation signal at each remote communication device, the remote signal having an IF frequency that may be unique to the remote communication device; and receiving the remote signals; and extracting data from the remote signals.

BRIEF DESCRIPTION OF THE DRAWINGS

The foregoing features and advantages of the present invention will be discussed in detail in the following non-limiting description of specific embodiments in connection with the accompanying drawings, wherein.

DETAILED DESCRIPTION OF THE INVENTION

Figure 2:
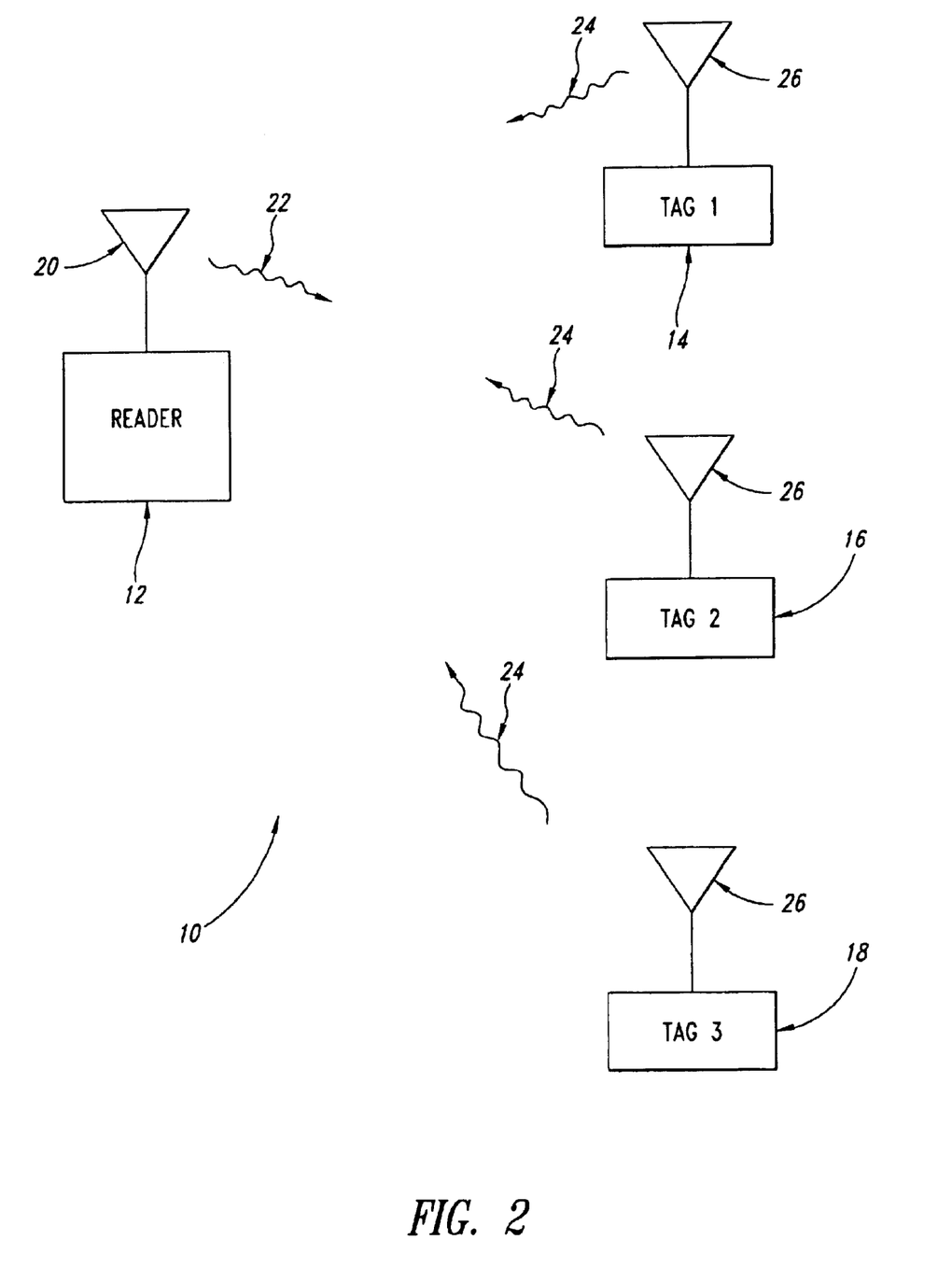
FIG. 2 is a diagram of one embodiment of a multi-frequency RFID remote communication system formed in accordance with the present invention.

Referring initially to FIG. 2, illustrated therein is a diagram of one embodiment of a multi-frequency RFID remote communication system 10 formed in accordance with the present invention. More particularly, the system 10 includes a reader 12 and a plurality of tags, a first tag 14, a second tag 16, and a third tag 18. The reader 12 includes an antenna 20 configured to transmit a first signal 22 and to receive a plurality of second signals 24 from the tag antennas 26. Although three tags are illustrated, the system may consist of one or a multiplicity of tags, and three tags are shown here as a representative sample for illustration.

In conventional systems, each of the tags 14, 16, 18 are programmed with a unique code to enable identification of an associated asset. The RFID system 10 utilizes an RFID wave of energy, in this case radio frequency signals 22 broadcast from the reader 12. Each tag 14, 16, 18 will in turn reflect or return this transmitted energy in a digital fashion. However, the returned signal 24 will now be identified with a particular tag and the associated asset.

Figure 3A:
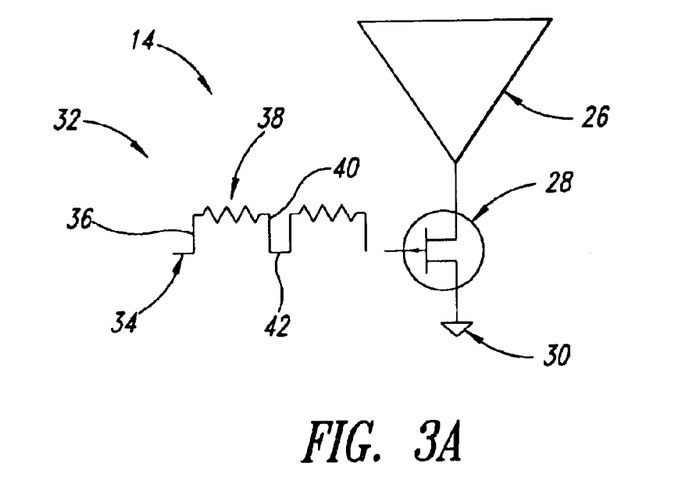
FIGS. 3A–3B are schematics of tag devices illustrated in FIG. 2.
Figure 3B:
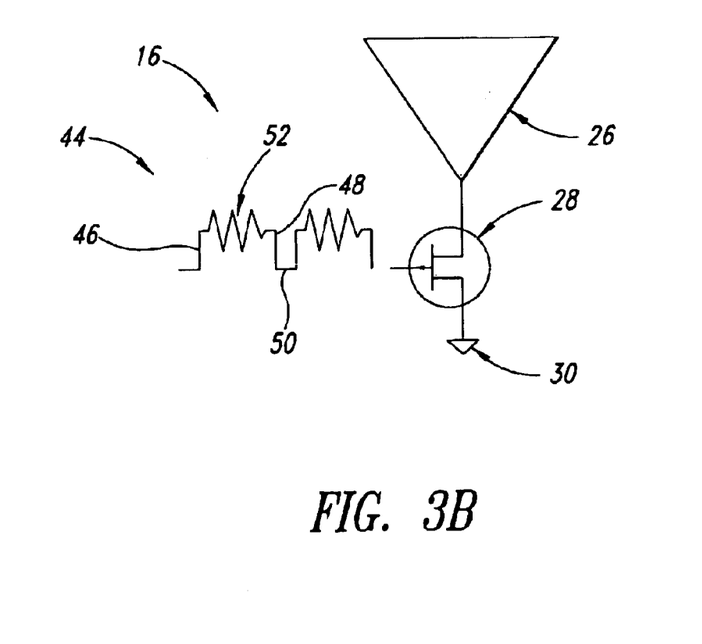

In this embodiment of the present invention, instead of merely reflecting or absorbing the RF energy 22 from the reader 12, each of the tags 14, 16, 18 will remodulate and reflect the energy in a two-tiered manner. Referring to FIGS. 3A–3B, shown therein are representative sketches of a portion of the first two tags 14, 16 showing the antenna 26 and a control switch 28, which are coupled in series to a ground reference 30. The first tag 14 generates a second signal 24 via the control switch 28, in this case an FET, with a two-tiered control signal 32 having a first modulation component 34 consisting of a low-level frequency digital code 36, such as ones and zeros, and which has contained within it a faster intermediate frequency (IF) 38 or data signal that contains the unique data associated with tag 14 at an IF frequency that may be unique.

In other words, the signal 32 has a first modulation component 34 at a primary frequency 36 having a first state 40 and a second state 42. In this embodiment, the IF modulation component 38 is imposed on the first state 40 of the primary frequency 36. In FIG. 3B, the second tag 16 has a control signal 44 with a primary frequency 46 having a first state 48 and a second state 50. An IF modulation component or data signal 52 is imposed on the first state 48. Here, the IF modulation 52 is shown at a higher frequency than the IF modulation 38 in FIG. 3A. It should be noted that both tags 14, 16 can share the same frequency of the first modulation component 34 while the IF modulation component 38 of the first tag 14 can be at a lower frequency than the IF modulation component 52 of the second tag 16, thus enabling the reader 12 to distinguish the two tags and to associate the unique data retrieved from the data signal embedded in the IF modulation components 38, 52 with the correct tag.

Figure 4:
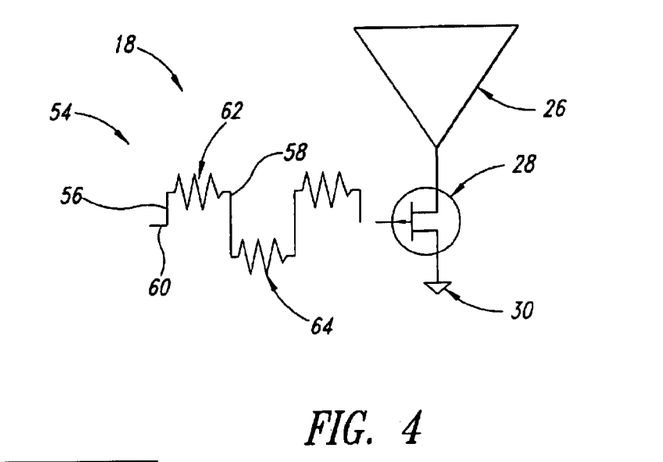
FIG. 4 is a schematic of a multi-frequency two-level IF tag formed in accordance with the present invention.

It should also be noted that the IF modulation component can be imposed on the second state of the primary frequency of the invention. In accordance with another embodiment of the present invention, two distinct IF modulation components be imposed on a single first modulation component. For example, referring to FIG. 4, shown therein is the third tag 18 having the antenna 26, control switch 28, and ground reference 30 as the first and second tags 14, 16. For ease of reference, the same reference numbers used with respect to the tags in FIG. 3 are used throughout FIG. 4 as well as FIGS. 5A–5B. In this embodiment, the control signal 54 has a first modulation component or primary frequency 56 with a first state 58 corresponding to a high level and a second state 60 corresponding to a low level. A first IF modulation 62 is imposed on the first state 58 and a second IF modulation 64 imposed on the second state 60. Here, the second IF modulation 64 is at a higher frequency than the first IF modulation 62.

Figure 5A:
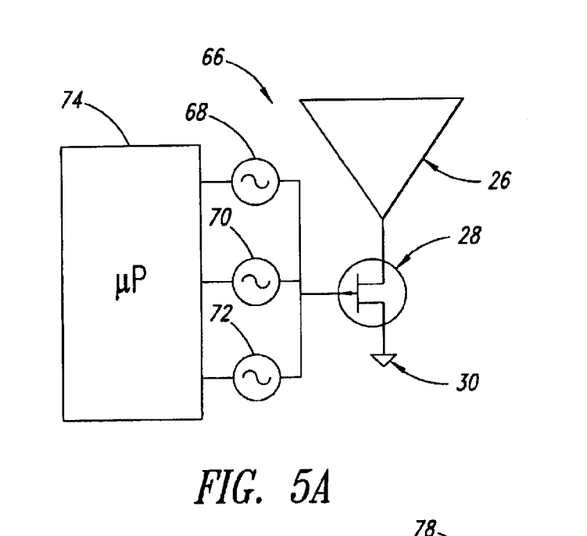
FIGS. 5A–5B are schematics of multi-frequency and variable-frequency tags, respectively formed in accordance with the present invention.
Figure 5B:
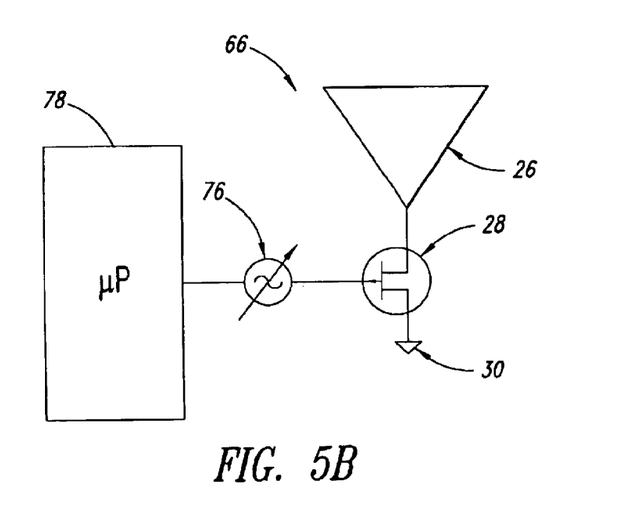

The manner in which the control signals and resultant return signals are generated is shown in FIGS. 5A and 5B. A tag 66 having an antenna 26 coupled in series with a switch 28, in the form of an FET to a common ground reference 30 is shown. In FIG. 5A, the tag 66 receives a control signal from first, second, and third signal generators 68, 70, 72 that in turn are controlled by a microprocessor 74. The first, second, and third signal generators 68, 70, 72 each generate a signal at a different frequency. Selection of which signal generator to use at a given time may be according to a fixed pattern, a random pattern, or a pseudo-random pattern. The selection pattern may be programmed directly into the microprocessor 74, or individual signal generators may be switched on and off by a remote signal from a reader. Alternatively, different patterns may be programmed into the microprocessor and the selection of the pattern may be made via a signal generated by a reader.

In the embodiment depicted in FIG. 5B, a variable frequency oscillator 76 coupled to a microprocessor 78 is shown. In FIG. 5B, the microprocessor again may be programmed to directly control the variable frequency oscillator 76, or the microprocessor 78 itself may be controlled remotely by the reader to in turn control the variable frequency oscillator 76.

By enabling a single tag 66 to modulate at two or more IF frequencies, the data stored in the tag 66 can be transmitted at a much higher rate than is otherwise possible. Modulating at plural IF frequencies allows the data to be transmitted in parallel rather than the serial fashion of prior art RF tags. The data is transmitted in parallel in that each IF frequency can carry a different bit or collection of bits of information simultaneously with the other IF frequencies. Put mathematically, employing n IF frequencies within a single tag allows $2^n$ times as much data to be transmitted compared to prior art tags.

Figure 6:
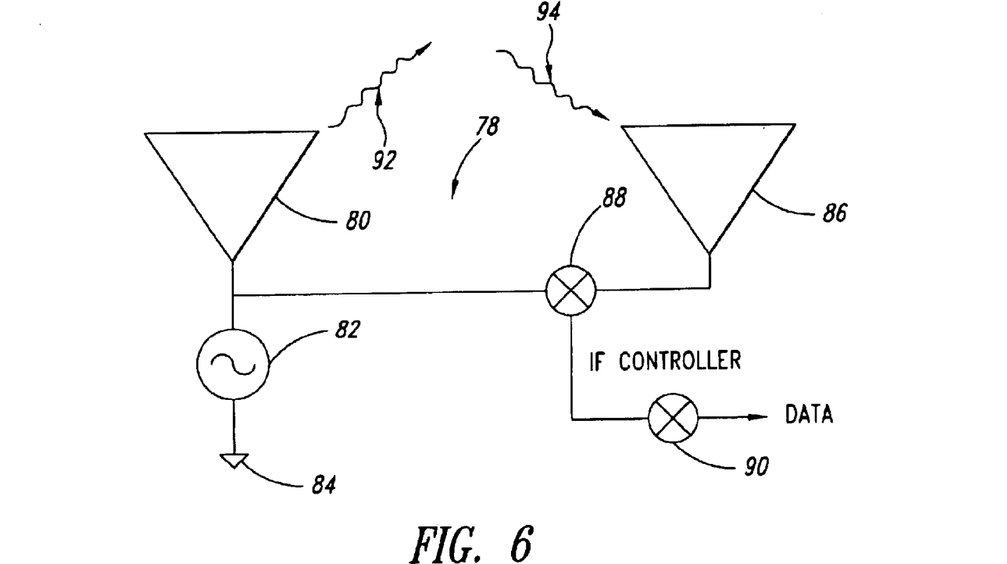
FIG. 6 is a schematic of a multi-frequency reader formed in accordance with the present invention.

Turning next to FIG. 6, illustrated therein is a multiple IF reader 78 formed in accordance with one embodiment of the invention. The reader 78 includes a transmit antenna 80 with associated oscillator circuit 82 and ground reference 84. The reader 78 also includes a receiving antenna 86 coupled to a signal processing circuit in the form of a mixer 88 that in turn is coupled to an IF controller in the form of a second mixer 90, the output of which is referred to as DATA. In this embodiment, the oscillator circuit 82 transmits through the antenna 80 an interrogation signal 92 that is received by remote communication devices (not illustrated). After the remote communication devices process the interrogation signal 92 and return a remote signal 94 that is received at the receiving antenna 86, it is processed through the first mixer 88.

It should be appreciated that a multiple IF reader can be implemented with a single antenna that is used for both transmission and reception. The reader 78 is shown in FIG. 6 as having two antennas for ease of illustration.

In accordance with the above-described embodiments of the invention, the remote signal 94 is a two-tiered signal comprising a low level first modulation component at a low level frequency and a higher IF modulation component or data signal at a higher frequency. When the signal 94 is received at the antenna 86, it is first processed through the mixer 88 to only let the IF modulation component pass through. The IF modulation component is then further processed through the IF controller or second mixer 90 which analyzes the IF modulation component and outputs the DATA. The foregoing reader components are readily commercially available and will not be described in detail herein.

Figure 7:
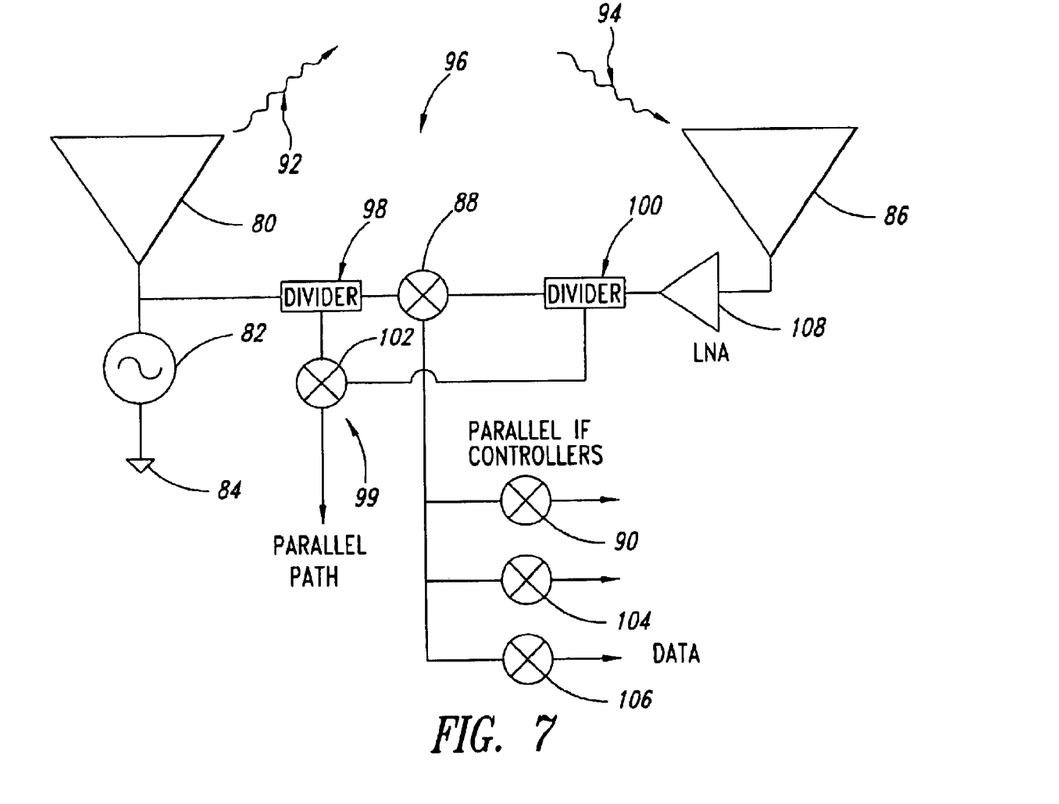
FIG. 7 is a schematic of an alternative embodiment of a multi-frequency reader formed in accordance with the present invention.

FIG. 7 illustrates a reader 96 formed in accordance with another embodiment of the present invention. The illustration of the reader 96 in FIG. 7 uses the same reference numbers for elements in common with the reader 78 in FIG. 6. Here, the reader 96 has a parallel path 99 for processing received signals 94 that includes a first divider 98 coupled between the transmitting antenna 80 and the first mixer 88, a second divider 100 coupled between the first mixer 88 and the receiving antenna 86, and a third mixer 102 having first and second inputs coupled to the first and second dividers, 98, 100, respectively, and an output going to a parallel path of second mixers (not shown) that are identical to the first path of mixers, including the second mixer 90, a fourth mixer 104, and a fifth mixer 106 coupled to the first mixer 88. Each of the mixers 90, 104, 106 are configured to receive and process an IF modulation component of a predetermined frequency. An optional low noise amplifier 108 may be coupled between the receiving antenna 86 and the second divider 100 for boosting the received signal 94.

The parallel path 99 formed by the two dividers 98, 100 and the third mixer 102 is configured to provide coverage for signals lost due to phase shifting, such as quadrature nulls. The parallel path processes the remote signal 94 identical to the path formed by the first mixer 88, second mixer 90, fourth mixer 104, and fifth mixer 106. Thus, signals not received in the first path will be received via the parallel path 99 to provide more complete coverage.

CLOSURE

While preferred embodiments of the invention have been illustrated and described, it is to be understood that various changes may be made therein without departing from the spirit and scope of the invention. Consequently, this invention is to be limited only by the scope of the claims that follow.

We claim:

1. A remote communication device, comprising: a communication circuit configured to receive a first signal and to return a reflected second signal responsive to the first signal, the second signal modulated by a first modulation frequency and a second modulation frequency, the second modulation frequency imposed on the first modulation frequency and comprising at least one data signal unique to the communication device, wherein the second modulation frequency comprises first and second data signals, wherein the first data signal is generated by a first data signal generator and the second data signal is generated by a second data signal generator, wherein the first and second data signals are generated at frequencies different from one another, wherein the communication circuit is further configured to generate a supply voltage from the first signal.

2. The device of claim 1, wherein the first and second signals comprise radio frequency signals.

3. The device of claim 1, wherein the at least one data signal generator comprises a variable frequency signal generator.

4. The device of claim 2 wherein the communication circuit is further configured to receive an energy signal from an energy signal source and to generate a supply voltage from the energy signal.

5. The device of claim 2, wherein the communication circuit is further configured to activate and deactivate upon receipt of remote activation and deactivation signals, respectively.

6. A remote communication device, comprising: an antenna for receiving at least a first signal and returning a reflected second signal; and a signal processing circuit coupled to the antenna for generating the second signal in response to the first signal, the signal processing circuit comprising at least a first modulation circuit for modulating the second signal at a primary frequency and a second modulation circuit for modulating the second signal at an at least one intermediate frequency imposed on the primary frequency that includes a first data signal and a second data signal unique to the remote communication device, wherein the at least one intermediate frequency is a frequency higher than the frequency of the primary frequency, wherein the antenna and the signal processing circuit are configured to receive an energy signal and to generate a supply voltage from the energy signal for supplying current to the signal processing circuit.

7. The device of claim 6, wherein the first and second signals comprise radio frequency signals.

8. The device of claim 7, wherein the primary frequency comprises first and second states, and the at least one intermediate frequency is imposed on the first state.

9. The device of claim 7, wherein the primary frequency has first and second states, and a first intermediate frequency is imposed on the first state and a second intermediate frequency is imposed on the second state.

10. A reader for communicating with a plurality of remote communication devices at a plurality of intermediate frequencies, comprising: an antenna for receiving a plurality of remote reflected signals each remote reflected signal modulated at a first intermediate frequency and a second intermediate frequency imposed on the first intermediate frequency; and a first receiving circuit coupled to the antenna for extracting data simultaneously from each of the remote reflected signals, wherein the first receiving circuit comprises at least one processing circuit for extracting data from each of the remote reflected signals, each at least one processing circuit configured to process a remote reflected signal of a predetermined frequency, further comprising a second receiving circuit for extracting data simultaneously from each of the remote reflected signals that are not received in the first receiving circuit due to a phase shift in the remote reflected signals, the second receiving circuit coupled to the antenna in parallel with the first receiving circuit and having at least one processing circuit configured to process a remote reflected signal of a predetermined frequency, further comprising a transmitting circuit coupled to the antenna for transmitting an interrogation signal to the first and second remote communication devices, wherein the antenna comprises a transmitting antenna coupled to the transmitting circuit and a receiving antenna coupled to the first and second receiving circuits, further comprising a low noise amplifier coupled between the receiving antenna and the first and second receiving circuits, further comprising a first divide-by-two circuit coupled between the transmitting antenna and the first and second receiving circuits and a second divide-by-two circuit coupled between the receiving antenna and the first and second receiving circuits.

11. The reader of claim 10, further comprising a low noise amplifier coupled between the receiving antenna and the second divide-by-two circuit.

12. The reader of claim 10, wherein the first and second receiving circuits each comprise a first processing circuit for extracting an intermediate frequency signal from each of the plurality of remote reflected signals, and a second processing circuit for extracting data from the intermediate frequency signal.

13. The reader of claim 12, wherein the second processing circuit comprises a plurality of mixer circuit, each configured to extract data from a single intermediate frequency different from the other of the plurality of mixer circuits.

14. A multi-frequency communication system, comprising: a plurality of remote communication devices, each remote communication device comprising: an antenna for receiving at least a first signal and returning a remote reflected signal; and a processing circuit coupled to the antenna for generating the remote reflected signal in response to the first signal, the processing circuit comprising at least a first modulation circuit for returning the remote reflected signal at a primary frequency and a second modulation circuit for modulating the remote reflected signal at at least one intermediate frequency imposed on the primary frequency and unique to that remote communication device, and to include a data signal unique to that remote communication device, wherein the at least one intermediate frequency is a frequency higher than the frequency of the primary frequency, wherein the antenna and the processing circuit are configured to receive an energy signal and to generate a supply voltage from the energy signal for supplying current to the signal processing circuit; and a reader for communicating with the plurality of remote communication devices at multiple frequencies, the reader comprising: an antenna for receiving the remote reflected signals at multiple frequencies; and a first receiving circuit coupled to the antenna for extracting data simultaneously from each of the remote reflected signals.

15. The system of claim 14, wherein the first signal and the remote reflected signals comprise radio frequency signals.

16. The system of claim 15, wherein the first receiving circuit comprises at least one processing circuit, each at least one processing circuit configured to process a remote reflected signal of a predetermined frequency.

17. The system of claim 16, wherein the at least one processing circuit comprises a first processing circuit for extracting the at least one intermediate frequency from the remote reflected signal and a second processing circuit for extracting data from the at least one intermediate frequency signal.

18. The system of claim 17, wherein the primary frequency comprises first and second states, and the at least one intermediate frequency is imposed on the first state.

19. The system of claim 17, wherein the remote reflected signal comprises the primary frequency and first and second intermediate frequencies, and further wherein the second processing circuit of each of the at least one processing circuit is configured to extract data from the first and second intermediate frequencies.

20. The system of claim 19 wherein the primary frequency has first and second states, and the first intermediate frequency is imposed on the first state and the second intermediate frequency is imposed on the second state.

21. The system of claim 17, wherein the reader further comprises a second receiving circuit for extracting data simultaneously from each of the remote reflected signals that are not received in the first receiving circuit due to phase shifts.

22. The system of claim 21, wherein the reader further comprises a transmitting circuit coupled to the antenna for transmitting the first signal to the remote communication devices.

23. The system of claim 22, wherein the antenna comprises a transmitting antenna coupled to the transmitting circuit and a receiving antenna coupled to the receiving circuit.

24. The system of claim 23, further comprising a low noise amplifier coupled between the receiving antenna and the first and second receiving circuits.

25. The system of claim 22, further comprising a first divide-by-two circuit coupled between the transmitting antenna and the first and second receiving circuits and a second divide-by-two circuit coupled between the receiving antenna and the first and second receiving circuits.

26. The system of claim 25, further comprising a low noise amplifier coupled between the receiving antenna and the second divide-by-two circuit.

27. A method for remote communication between a plurality of remote communication devices and a reader, the method comprising: receiving an interrogation signal at the plurality of remote communication devices; reflecting from each remote communication device a remote reflected signal responsive to the interrogation signal, the remote reflected signal of each remote communication device having a frequency different from the remote reflected signal of the other remote communication devices, each remote reflected signal modulated by a first modulation circuit at a primary frequency and by a second modulation circuit at an at least one intermediate frequency imposed on the primary frequency, wherein the at least one intermediate frequency is a frequency higher than the frequency of the primary frequency; generating a supply voltage for the first and second modulation circuits from the interrogation signal at each remote communication device; receiving the remote reflected signals from each remote communication device; and extracting data from each remote reflected signal.

28. The method of claim 27, wherein before receiving the interrogation signal, comprising transmitting the interrogation signal.

29. The method of claim 28, wherein generating each remote reflected signal comprises generating a multi-frequency remote reflected signal to have a primary frequency and an intermediate frequency, the intermediate frequency including a data signal unique to each remote communication device; and extracting the data from the remote reflected signal comprises removing the extracting the data from the intermediate frequency.

30. The method of claim 28, wherein each of the multi-frequency signals is received and processed simultaneously.

* * * * *